Patented Mar. 31, 1953

2,633,432

UNITED STATES PATENT OFFICE 2,633,432

HEAT-SEALABLE LABEL STOCK

Harold J. Kenneway, Jr., Brookfield, Mass., assignor to McLaurin-Jones Co., Brookfield, Mass., a corporation of Massachusetts No Drawing. Application September 29, 1949, Serial No. 118,717

5 Claims. (Cl. 117—76)

This invention relates to sheet materials carrying a coating of adhesive and, more especially, to those adapted for use in the manufacture of labels, wrappers, sealing tapes, and the like (all hereinafter included in the term "label stock"), and in which the adhesives are of a waterproof, normally solid, non-tacky character, but adapted to be activated by heat.

Sheet materials of this character have been widely used for many years, and in recent years they have gone into even more general use because of the production of a great variety of heat-sealing resinous compounds suitable for use in products of this nature. Many of these are synthetic resins, and their adaptability for use on adhesive tapes, wrappers, and labels, has been enhanced by the development of modifiers which, in combination with certain of these resins, or mixtures of them, serve to impart the various characteristics required for specific purposes. For example, most of these resins have inherently selective adhesive characteristics which make them particularly adapted for use on certain surfaces, some producing a firm adhesion with glass, wood, plastic surfaces, and the like, while others adhere only weakly or indifferently to these surfaces but bond to others having different characteristics. However, by mixing certain of these resins together, or modifying their adhesive properties by the use of other constituents which may not, themselves, be adhesive, ways have been found to use these resins very widely on a tremendous number of products. In other words, the development of adhesive mixtures of this general nature which will satisfy the requirements of an individual product, have been well worked out.

A serious objection to the use of heat-sealable adhesives for the purposes above mentioned, however, is the fact that the adhesive coating must be activated while it is in contact with the package or other work piece to which it is to be applied. This requires, in the case of a label, tape, or the like, the application of heat to the opposite face of the sheet, which frequently is difficult to accomplish, particularly with packages of irregular shape or, in fact, any package, the surface of which is not flat.

A further characteristic of these heat-sealable adhesives which seriously limits their field of usefulness is the fact that, when activation has been accomplished and the heating element or medium is removed, the adhesive coating then cools off very rapidly and sets up quickly. This is a serious objection, for example, in machine-sealing when an interruption occurs in the operation of the machine.

Similar difficulties occur in connection with labeling or sealing packages containing perishables, or those such as butter, which have a very low melting point, or any merchandise, wrapped with certain synthetic sheet materials, such as Pliofilm, the melting or softening point of which is very low. With the ordinary machine-sealing methods, this situation requires the use of a label, wrapper, or tape coated with an adhesive having even a lower melting point than that of the wrapper.

The present invention is primarily concerned with the foregoing considerations, and it aims to device a thoroughly satisfactory solution for the problem presented by them. Stated more specifically, the invention has for an important object the provision of a sheet material of the character above mentioned coated with a thermoplastic adhesive composition which will be firm, dry, and non-tacky under normal conditions of temperature and humidity, and which, therefore, can be shipped, stored, stacked, and otherwise handled without danger of "blocking," i. e. the sheets sticking together, but which can be activated by heat in the usual manner and which, when so activated, will retain its adhesive characteristics for a substantial period of time sufficient, for example, to allow the label, tape, or the like, to be applied later at a place, time, temperature and humidity selected to suit the convenience of the packager, as opposed to the prior art necessity of applying the tape or label while in contact with the heating element of a heat-sealing machine.

It has been proposed heretofore to realize these objects in some measure by producing a coated material of the character above described in which the adhesive element is a synthetic resinous material and the plasticizer is of crystalline form, the two being intimately intermingled to produce an approximately homogeneous film or coating. The products made in this manner, however, have not proved satisfactory for the reason that a deterioration of the adhesive coating occurs while the goods are in storage. In other words, the label stock has what is referred to in the trade as a poor "shelf life." It is one of the objects of this invention to overcome this difficulty.

I have found that the foregoing objects can be realized by applying the adhesive and the plasticizing materials in separate layers and maintaining them as discrete and individually distinct films or layers up to the point of activation by heat. During such activation the constituents fuse and merge or blend so that the entire coating becomes very tacky and it remains in this condition for a substantial period of time, depending upon the rate at which it cools off and the proportions and character of the ingredients of which it is composed. In other words, the thermoplastic characteristics of the coating, as well as its thermosetting properties and the time factor required for it to set up when cooling, can all be predetermined by proper selection of the ingredients and suitable proportioning of them.

As above stated, the matter of producing adhesive coatings suitable for use on labels, tapes, and the like, is well understood in the industry. But this invention adds to that knowledge a teaching of a new means for and a method of predetermining and controlling, as a practical matter, the length of time which coatings of thermoplastic waterproof adhesives can be made to remain in a usefully tacky condition after having once been activated and prior to setting up into a solid non-tacky condition.

For the purposes of this invention a great variety of thermoplastic heat-sealable resins may be used and suitable normally solid plasticizers for them are well known. In general, any thermoplastic heat-sealable resin which can be plasticized by diphenyl phthalate is satisfactory, although the invention is not limited to resinous materials having this characteristic. Usually in compounding the materials for producing the multiple layers which this invention requires, it will be found necessary to use one or more modifiers with the primary ingredients for the purpose of giving the coating exactly the degree of adhesion desired, the spreading characteristics suited to machine application, or producing the particular viscosity, consistency, or some other characteristic desired for the individual result to be produced. These, in general, are well understood in this art.

The nature of the invention and the manner of utilizing it will be apparent to those skilled in this industry from the foregoing and the following formulae:

Formula #1

Base coat:

| | Parts |
|---|---|
| Staybellite Ester #10 | 13½ |
| Piccolastic A-75 | 54 |
| Toluol | 47 |
| Triton N. E. | ¾ |
| Dow Latex 512 K | 18 |

Top coat:

| | Parts |
|---|---|
| Triton N. E. | 3 |
| Dow Latex 512 K | 36 |
| Acrysol G. S. (5% solution) | 9 |
| Diphenyl phthalate | 60 |
| Water | 40 |

In these formulae all the parts are by weight.

The Piccolastic A-75 is a plastic styrene polymer utilized here for its heat-sealing properties. The Staybellite Ester #10 is the glycerine monoethylene glycol ester of hydrogenated rosin. It is a tackifier and adds to the strength of the bond of the activated adhesive.

The Dow Latex 512 K is an aqueous dispersion of a styrene-butadiene copolymer much used in the coating industry. It is very thermoplastic, imparts thread and body to the coats in which it is used and improves the flow and spreading properties of the constituents in machine-coating. Also, it is useful in bonding the top coat and base coat together.

The Triton N. E. is an aryl alkyl polyether alcohol solution with the ability to disperse the Dow Latex 512 K in the resin soutions and to prevent agglomeration of the Dow Latex 512 K in the toluol.

Toluol is a solvent for the first two constituents of the base coat. Diphenyl phthalate is the solid plasticizer, and the Dow Latex 512 K serves as an adhesive to bind the diphenyl phthalate to the base coat. The Acrysol G. S. is a water solution of sodium polyacrylate and serves as a thickening agent for the Dow Latex 512 K.

All of the constituents above mentioned are readily obtainable in the open market, the Staybellite from Hercules Powder Company; the Piccolastic A-75 from Pennsylvania Industrial Chemical Corporation; the Acrysol and Triton N. E. from Rohm and Haas; and the Dow Latex 512 K from the Dow Chemical Company.

A typical method of preparing the foregoing compositions is as follows:

For the base coat the Staybellite Ester #10 and the Piccolastic A-75 resins are reduced to a coarse powder by one pass through a Fitzpatrick comminuting machine, using the impact knife surfaces. These two resins are added at the rate of about ten pounds per minute to a container (tub or kettle) of toluol at room temperature, which is under agitation by a Lightnin mixer. When the resins are stirred into the solvent the Triton N. E. and Dow Latex 512 K are added to the stirring mix at the rate of about five pounds per minute. (The Triton N. E. solution is hand paddled into the Dow Latex 512 K emulsion, and they are added as a mixture.) The comminuter can take care of 200–300 lbs. of the above resins in an hour.

In using these coating compositions the base coat is applied to the backing sheet in the customary manner, usually in a coating machine. When the base coat film has been set up or dried, the top coat is applied over it. This coat is allowed to dry thoroughly, after which the coated web may be cut into strips which are rolled up for storage or shipment, or the web may be cut into sheets which may be stacked, one upon another, without danger of blocking.

Formula #2

Base coat:

| | Parts |
|---|---|
| Staybellite Ester #10 | 13½ |
| Piccolastic A-75 | 54 |
| Toluol | 47 |
| Triton N. E. | ¾ |
| Dow Latex 512 K | 18 |

Top coat:

| | Parts |
|---|---|
| Triton N. E. | 2 |
| Dow Latex 512 K | 30 |
| Acrysol G. S. (5% solution) | 8 |
| Aroclor 1268 | 50 |
| Water | 50 |

Apart from some slight differences in proportions, Formula #2 differs from Formula #1 mainly in that the diphenyl phthalate is replaced by Aroclor 1268. This is a chlorinated hydrocarbon, normally solid, obtainable from Monsanto Chemical Company, and it serves, when the entire coat is activated, to plasticize the resins of the base coat and to form an adhesive which retains its tackiness after removal of the activating medium.

Formula #3

Base coat: | Parts
--- | ---
Vuecote #309 | 50
Cellulose nitrate | 10
Santicizer #130 | 7.5
Dow Latex 512 K | 14.0
Acetone | 220.0

Top coat: | Parts
--- | ---
Triton N. E | 3
Dow Latex 512 K | 36
Acrysol G. S. (5% solution) | 9
Diphenyl phthalate | 60
Water | 40

In the foregoing the Vuecote #309 and the Santicizer #130 are both obtainable from Monsanto Chemical Company, the former being a thermoplastic heat-sealable resin, as is also the cellulose nitrate. The Santicizer operates as a plasticizer for both of these resinous materials. The Dow Latex 512 K functions as in Formula #1, and the acetone serves as a solvent for the first two constituents.

Formula #4

Base coat:: | Parts
--- | ---
Polyamide Resin #94 | 20
Toluol | 17
Methyl alcohol | 17
Cellulose nitrate | 2
Acetone | .10
Dow Latex 512 K | 6.4
Santicizer #130 | 4.0

Top coat: Same as in Formula #1.

The Polyamide Resin #94 is produced by the reaction of dimerized and trimerized linoleic and linolenic acids of soy bean oil with ethylene diamine. This resin and the cellulose nitrate form the thermoplastic constituents of the base coat; while the acetone is a solvent for the cellulose nitrate; the Dow Latex 512 K performs the same functions as in the other base coat formulae; and the Santicizer #130 acts as a plasticizer for the polyamide resin. The latter is obtainable from General Mills.

Formula #5

Base coat: Pyroxcote #23-159-5-N. W.—a heat-sealing lacquer, of the nitro-cellulose type, supplied by Pyroxylin Products, Inc. This is a compounded heat-sealable resin in liquid form as sold commercially.

Top coat: Same as in Formula #1.

Formula #6

Base coat: Pyroxcote #19-231-N. W. This is a compounded heat-sealable resin in liquid form as sold commercially. It is of the nitro-cellulose type.

Top coat: Same as in Formula #1.

Formula #7

Base coat: Same as Formula #2.

Top coat: | Parts
--- | ---
Menthyl phenol | 10
Triton N. E | 5
Dow Latex 512 K | 6.0

The menthyl phenol is a solid plasticizer for the base coat resins when activated by heat at such a temperature and for a length of time sufficient to fuse the entire composite coat.

Formula #8

Top coat: Same as the top coat of Formula #1.

Base coat: | Parts
--- | ---
Staybellite Ester #10 | 1.3
Piccolastic A-75 | 5.4
Toluol | 4.5
Dow Latex 512 K | 1.8
Triton N. E | .1
Esterol wax emulsion | .5

The constituents of this top coat have been referred to above, with the exception of the esterol wax emulsion which has been incorporated in this formula because of its anti-blocking properties.

Formula #9

Base coat: Same as Formula #1, except that the Piccolastic A-75 is replaced by Piccolastic E-75.

Top coat: Same as Formula #1.

Formula #10

Base coat: | Parts
--- | ---
(Esso) Tervan 2536 | 125
(Enjay Co. Inc.) Vistanex B-80X | 10
(Advance Solvents) Vistac P | 5
(Enjay) S-50 Polymer | 55
(Enjay) S-60 Polymer | 55

In this formula the Tervan is a micro-crystalline wax, which imparts anti-blocking characteristics.

The Vistanex B-80-X is a saturated isobutylene polymer with a high degree of tack.

The Vistac P is a low molecular weight polybutene with good adhesive properties when combined with waxes.

Both S-Polymers are high molecular weight isobutylene-stryrene copolymers with good tack.

The preparation of these Formulae Nos. 3 to 10, inclusive, will be obvious to those skilled in this art from what has already been said in connection with making up Formula #1.

When a label, tape, wrapper, or the like, coated with an adhesive made in accordance with any one of the foregoing formulae is to be applied to a wrapper, package, or other article, it is heated sufficiently to melt the plasticizer and soften the bast coat resins, whereupon the constituents become merged or blended. The coating then will remain tacky for an appreciable period of time, determined by the nature and proportions of the ingredients selected. During this period the adhesively coated surface of the tape or label can be applied to the package or wrapper where it will adhere, due to the initial tackiness of the softened coating. As the coating cools off, it hardens and forms a stable bond uniting the label to the wrapper or other article.

Below is a list showing important thermoplastic characteristics of the coatings made from the Formulae above given:

| Formula Number | Initial Tack Temp., °F. | Duration of Utilizable Tack |
| --- | --- | --- |
| #1 | 145 | over 48 hours. |
| #2 | 200 | over 60 seconds. |
| #3 | 140-145 | over 20 minutes. |
| #4 | 140-145 | over 15 seconds. |
| #5 | 140-145 | over 60 minutes. |
| #6 | 140-145 | Do. |
| #7 | 120-125 | over 24 hours. |
| #8 | 120 | Do. |
| #9 | 135 | Do. |
| #10 | 150 | about 3 hours. |

In general, a great number of well known synthetic thermoplastic heat-sealable resins having good adhesive properties can be used as the chief constituent of one coat. Among these may be mentioned particularly the polymeric resins above referred to and cellulosic resinous materials including cellulose esters, such as cellulose acetate and cellulose nitrate, and cellulose ethers such, for example, as ethyl cellulose. Also, this base coat will include suitable modifiers.

The essential constituent of the other coat will be a normally solid plasticizer for one or more of the resins of the base coat. Usually one, at least, of these coats will contain an adhesive constituent which serves to bond the two layers together, or a special ingredient for this purpose may be included. The outer coat can be made of such a composition as to have ample anti-blocking characteristics while the entire coat, nevertheless, after activation, has very strong adhesive properties.

In this connection it should be noted that either the coat containing the resinous adhesive constituent, or that consisting essentially of the plasticizer, may be made the top coat. This is important when the ingredient relied upon mainly for adhesive strength is subject to degradation by oxidation. Under these conditions it should be made the bottom coat, next to the paper backing, and the plasticizing layer should be the top coat where it will seal off the bottom coat from the outside air.

An important advantage of this invention is the fact above emphasized that the two layers or films which make up the adhesive coat are maintained individually distinct and separate until activation occurs. Then these coats fuse and blend, producing the tacky condition necessary to unite adhesively with the package, wrapper, or other article of work. This means that the plasticizer and the resinous adhesive have no opportunity to react materially, one on the other, while the product remains in storage. In other words, the "shelf life" of the end product is entirely satisfactory.

A possible, but less desirable, way of preventing interaction between the layers of the adhesive coating is to use a barrier layer or film between them. A suitable material for this purpose is Acra wax put out by the Glyco Products Co. Inc. of Brooklyn, New York. It blends well with different resins and has adhesive properties which are useful.

As above indicated, the temperature at which the adhesive coating will soften and become tacky may be varied widely. It may be as low as 120° F. and more often will be higher but, as a rule, should not be greater than 200° F. Because the sealing temperature may be quite different from the initial tack temperature, the latter does not have the importance in sealing tapes and labels made in accordance with this invention that it does with the prior art products of this nature.

Also, because the activating step and the application of the tape, label, wrapper, or the like, to the package or article of work to which it is to be bonded are independent and can be spaced apart widely, both as to time and distance, the invention completely avoids the common objections that have attended the use of tapes or labels coated with thermoplastic adhesives requiring activation in order to secure them to the work. This independence means that each step can be carried out under conditions best suited to its individual requirements, neither step being complicated by the requirements of the other. Thus the invention makes it entirely feasible to use tapes or labels carrying a thermoplastic adhesive in situations and under conditions which have prevented such use heretofore.

While I have herein shown and described typical embodiments of my invention, it will be evident that the invention is susceptible of embodiment in a great variety of other forms without departing from the spirit or scope thereof.

Having thus described my invention, what I desire to claim as new is:

1. A heat-sealable label stock comprising a backing sheet having adherently bonded to one surface thereof a dry, solid coating by means of which it may, upon heat activation of the coating, be adhesively secured to another article, the coating being normally dry and non-tacky and including a plurality of individually distinct layers superposed one upon the other, at least one of said layers consisting essentially of a solid thermoplastic resinous material and another of said layers consisting essentially of a solid plasticizer for said material, said material and said plasticizer coexisting each in physically independent layers, but being adherently bonded to each other and being adapted to blend on heating, the plasticizer being present in significant and sufficient proportion to merge upon heating with said adhesive material to provide a tacky, adhesive coating which after subsequent cooling will have and retain for a substantial period of time adhesiveness permitting its application to use without reheating, but which finally returns to a hard and non-tacky condition.

2. A heat-sealable label stock according to preceding claim 1, in which one at least of said layers includes in addition an adhesive bonding agent for holding it and its companion layer together.

3. A heat-sealable label stock according to preceding claim 1, in which said thermoplastic resinous material and said plasticizer are so proportioned that the coating remains non-tacky up to a temperature of at least 120° F. but fuses and becomes tacky at some temperature above that point and below 200° F.

4. A heat-sealable label stock according to preceding claim 1, in which said thermoplastic resinous material and said plasticizer are so proportioned that the coating has an initial tack temperature between 140° F. and 145° F.

5. A label stock according to preceding claim 1, including between the last two of said layers, an additional barrier layer of a thermoplastic material chemically inert at normal temperatures with reference to the layers which it separates but miscible with them when they fuse.

HAROLD J. KENNEWAY, Jr.

REFERENCES CITED

The following references are of record in the file of this patent:

UNITED STATES PATENTS

| Number | Name | Date |
| --- | --- | --- |
| 1,973,398 | Trolander et al. | Sept. 11, 1934 |
| 2,277,287 | Beckman et al. | Mar. 24, 1942 |
| 2,282,371 | McGill | May 12, 1942 |
| 2,322,048 | Nadeau et al. | June 15, 1943 |
| 2,325,408 | Kauppi et al. | July 27, 1943 |
| 2,402,605 | Cowen | June 25, 1946 |
| 2,453,052 | Etten | Nov. 2, 1948 |
| 2,462,029 | Perry | Feb. 15, 1949 |